(12) United States Patent
Tietz et al.

(10) Patent No.: US 9,237,093 B2
(45) Date of Patent: Jan. 12, 2016

(54) BANDWIDTH ON-DEMAND ADAPTIVE ROUTING

(71) Applicant: Silicon Graphics International Corp., Fremont, CA (US)

(72) Inventors: Joseph George Tietz, Tinton Falls, NJ (US); Gregory Michael Thorson, Altoona, WI (US); Eric C. Fromm, Eau Claire, WI (US)

(73) Assignee: Silicon Graphics International Corp., Milpitas, CA (US)

( * ) Notice: Subject to any disclaimer, the term of this patent is extended or adjusted under 35 U.S.C. 154(b) by 195 days.

(21) Appl. No.: 13/830,432

(22) Filed: Mar. 14, 2013

(65) Prior Publication Data

US 2014/0269324 A1 Sep. 18, 2014

(51) Int. Cl.
*H04L 12/721* (2013.01)
*H04L 12/703* (2013.01)
*H04L 12/803* (2013.01)
*H04L 12/707* (2013.01)

(52) U.S. Cl.
CPC ............... *H04L 45/28* (2013.01); *H04L 45/22* (2013.01); *H04L 45/70* (2013.01); *H04L 47/122* (2013.01)

(58) Field of Classification Search
None
See application file for complete search history.

(56) References Cited

U.S. PATENT DOCUMENTS

| | | | | |
|---|---|---|---|---|
| 4,499,578 A | * | 2/1985 | Marouf et al. | 370/267 |
| 4,644,496 A | * | 2/1987 | Andrews | 712/13 |
| 5,151,900 A | * | 9/1992 | Snyder et al. | 370/400 |
| 5,386,413 A | * | 1/1995 | McAuley et al. | 370/392 |
| 5,649,108 A | * | 7/1997 | Spiegel et al. | 709/241 |
| 5,659,796 A | * | 8/1997 | Thorson et al. | 709/241 |
| 5,701,416 A | | 12/1997 | Thorson et al. | 395/200.15 |
| 6,167,437 A | * | 12/2000 | Stevens et al. | 709/214 |
| 6,195,703 B1 | * | 2/2001 | Blumenau et al. | 709/238 |
| 6,216,167 B1 | * | 4/2001 | Momirov | 709/238 |
| 6,272,112 B1 | * | 8/2001 | Orita | 370/243 |
| 6,415,361 B1 | * | 7/2002 | Moh et al. | 711/141 |
| 6,687,756 B1 | * | 2/2004 | Rawson, III | 709/248 |
| 6,691,165 B1 | * | 2/2004 | Bruck et al. | 709/227 |
| 6,804,233 B1 | * | 10/2004 | Congdon et al. | 370/389 |
| 7,177,946 B1 | * | 2/2007 | Kaluve et al. | 709/242 |
| 7,209,476 B1 | * | 4/2007 | Colloff et al. | 370/360 |
| 7,395,346 B2 | * | 7/2008 | Pinder et al. | 709/232 |

(Continued)

OTHER PUBLICATIONS

Wikipedia.org, Non-Uniform Memory Access, http://en.wikipedia.org/wiki/Non-Uniform_Memory_Access, 4 pages, Feb. 22, 2013.

(Continued)

*Primary Examiner* — Bunjob Jaroenchonwanit
(74) *Attorney, Agent, or Firm* — Sunstein Kann Murphy & Timbers LLP

(57) ABSTRACT

An adaptive router anticipates possible future congestion and enables selection of an alternative route before the congestion occurs, thereby avoiding the congestion. The adaptive router may use a primary route until it predicts congestion will occur. The adaptive router measures packet traffic volume, such as flit volume, on a primary network interface to anticipate the congestion. The adaptive router maintains a trailing sum of the number of flits handled by the primary network interface over a trailing time period. If the sum exceeds a threshold value, the adaptive router assumes the route will become congested, and the adaptive router enables considering routing future packets, or at least the current packet, over possible secondary routes.

29 Claims, 9 Drawing Sheets

(56) References Cited

U.S. PATENT DOCUMENTS

| | | | | |
|---|---|---|---|---|
| 7,512,705 | B2* | 3/2009 | Mogul | 709/238 |
| 7,581,021 | B2* | 8/2009 | Errickson et al. | 709/238 |
| 7,593,336 | B2* | 9/2009 | Varanasi et al. | 370/235 |
| 8,077,602 | B2* | 12/2011 | Arimilli et al. | 370/217 |
| 8,693,485 | B2* | 4/2014 | Kotha et al. | 370/409 |
| 8,706,893 | B2* | 4/2014 | Even et al. | 709/231 |
| 8,767,587 | B1* | 7/2014 | Finn et al. | 370/255 |
| 2002/0194182 | A1* | 12/2002 | Fujita et al. | 707/10 |
| 2003/0106052 | A1* | 6/2003 | Morrison et al. | 717/170 |
| 2005/0102477 | A1* | 5/2005 | Sukegawa | 711/141 |
| 2005/0108444 | A1* | 5/2005 | Flauaus et al. | 710/15 |
| 2005/0228926 | A1* | 10/2005 | Smith et al. | 710/305 |
| 2005/0228952 | A1* | 10/2005 | Mayhew et al. | 711/133 |
| 2006/0047907 | A1* | 3/2006 | Shiga et al. | 711/114 |
| 2007/0079045 | A1* | 4/2007 | Luke | 710/313 |
| 2007/0091911 | A1* | 4/2007 | Watanabe et al. | 370/408 |
| 2008/0037544 | A1* | 2/2008 | Yano et al. | 370/392 |
| 2009/0013069 | A1* | 1/2009 | Gobara et al. | 709/224 |
| 2009/0190588 | A1* | 7/2009 | Eder et al. | 370/392 |
| 2009/0210711 | A1* | 8/2009 | Moskowitz | 713/171 |
| 2010/0217949 | A1* | 8/2010 | Schopp et al. | 711/173 |
| 2011/0066753 | A1* | 3/2011 | Wang et al. | 709/238 |
| 2011/0149986 | A1* | 6/2011 | Sugawara | 370/401 |
| 2012/0072635 | A1* | 3/2012 | Yoshida et al. | 710/306 |
| 2013/0021910 | A1* | 1/2013 | Crisan et al. | 370/238 |
| 2013/0051397 | A1* | 2/2013 | Guo et al. | 370/400 |
| 2013/0246715 | A1* | 9/2013 | Miyauchi | 711/147 |
| 2013/0250792 | A1* | 9/2013 | Yoshida et al. | 370/252 |
| 2014/0241443 | A1* | 8/2014 | Nowick et al. | 375/259 |

OTHER PUBLICATIONS

Wikipedia.org, Uniform Memory Access, http://en.wikipedia.org/wiki/Uniform_Memory_Acc, 1 page, Mar. 8, 2013.

* cited by examiner

BANDWIDTH ON-DEMAND ADAPTIVE ROUTING

FIELD OF THE INVENTION

The invention generally relates to multi-processor high-performance computer systems and, more particularly, the invention relates to managing routes between nodes of a non-uniform memory access computer system.

BACKGROUND OF THE INVENTION

High-performance computer ("HPC") systems typically include many processors, each with its own local memory. At least some pairs of the processors are interconnected via links to enable each processor to access memory ("non-local memory") of each, or at least some, of the other processors. Some such systems are constructed according to non-uniform memory access ("NUMA") designs, in which access to non-local memory is slower than access to local memory. Because a HPC system may not include a separate link between every pair of processors, some non-local memory accesses are routed through third (or more) processors, thereby traversing multi-hop routes. However, determining routes quickly for each non-local memory access poses problems. Furthermore, congested links or routes retard non-local memory accesses, thereby negatively impacting performance of the affected processor(s).

SUMMARY OF VARIOUS EMBODIMENTS

An embodiment of the present invention provides a computer system. The computer system includes a first computer. The first computer includes a memory and a processor coupled to the memory and configured to execute instructions fetched from the memory. The first computer also includes a plurality of network ports. Each network port of the plurality of network ports is configured to be connectable, via a respective link, to a respective network port on another computer of the computer system.

The first computer also includes an adaptive router coupled to the memory, the processor and the plurality of network ports. The adaptive router is configured to provide non-uniform memory access to the memory on the first computer by a processor on another computer of the computer system. The adaptive router is also configured to provide non-uniform memory access to memory on another computer of the computer system by the processor on the first computer. This non-uniform memory access is provided utilizing packets sent via a port of the plurality of network ports and its respective link.

The adaptive router is also configured to store information associating each of the network ports with at least one of the plurality of network ports as an at least one secondary network port. The adaptive router is also configured to accumulate historical information about an amount of data transferred via each port of the plurality of network ports. The adaptive router is also configured to automatically select, per packet, whether to consider using one of the at least one secondary network port, over which to send the packet. This selection is based at least in part on the historical information and independent of any information about congestion related to any port of the plurality of network ports.

The stored information associating the at least one secondary network port may be programmable. For example, this information may be stored in memory-mapped registers, which are programmable by the processor and possibly by other components.

If the adaptive router selects to consider using one of the at least one secondary network port, the adaptive router may be configured to identify a primary network port, based on at least a portion of a destination address within the packet. The adaptive router may be further configured to automatically select one port from at least one secondary network port associated with the primary network port, over which to send the packet.

If the adaptive router selects to consider using one of the at least one secondary network port, the adaptive router may be configured to automatically select a primary port or a secondary port, over which to send the packet. The primary port may be a port of the plurality of network ports. The primary port may be identified, based on at least a portion of a destination address within the packet. At least one secondary network port may be associated with the primary network port.

If the packet contains a routing limitation flag, the adaptive router may be configured to select the primary network port. In other words, the routing limitation flag prevents consideration of any secondary network port.

The adaptive router may be configured to select the primary network port, if at least a portion of a destination address within the packet meets a predetermined criterion. In other words, if the destination address meets the predetermined criterion, the adaptive may router use the primary network port and may not consider using any secondary port.

The adaptive router may be configured to consider only a subset of the at least one secondary network port associated with the primary network port, if at least a portion of a destination address within the packet meets a predetermined criterion. The subset may be based on at least a portion of the destination address within the packet.

During each time unit, at most a portion of a packet (a "flit"), less than the entire packet, may be sent via the port.

The historical information may include, per port of the plurality of network ports, for each time unit of a plurality of preceding time units, information indicating whether at least a portion of any packet was sent via the port during the time unit. The adaptive router may be configured to identify a primary network port, based on at least a portion of a destination address within the packet. If the historical information for the primary network port does not exceed a predetermined threshold value, the adaptive router may be configured to select the primary network port, over which to send the packet. Otherwise, the adaptive router may be configured to select consider using an at least one secondary network port associated with the primary network port, over which to send the packet.

If a port of the at least one secondary network port has become congested, the adaptive router may be configured not to select the port.

If the adaptive router selects to consider using one of the at least one secondary network port, the adaptive router may be configured to select which port of the plurality of network ports over which to send the packet, based at least in part on at least one criterion, such as the historical information or information about congestion related to a port of the plurality of network ports.

The adaptive router may be configured to use at least a portion of a destination address in the packet to determine which of the historical information and the information about congestion is used to select which port of the plurality of network ports over which to send the packet.

If the adaptive router selects to consider using one of the at least one secondary network port, the adaptive router may be configured to automatically select which port of the plurality of network ports over which to send the packet according to a round-robin selection scheme and/or according to a congestion avoidance scheme.

The historical information may include a trailing sum.

Another embodiment of the present invention provides a method for routing packets within a computer system. The computer system includes a first computer having a memory and a processor coupled to the memory and configured to execute instructions fetched from the memory. The first computer also includes a plurality of network ports. Each network port of the plurality of network ports is configured to be connectable, via a respective link, to a respective network port on another computer of the computer system. The first computer is configured to utilize packets sent via a port of the plurality of network ports and its respective link to provide non-uniform memory access to the memory by a processor on the another computer and to provide non-uniform memory access to memory on the another computer by the processor on the first computer. The method includes storing information associating each network port with at least one of the plurality of network ports as an at least one secondary network port. The method also includes accumulating historical information about an amount of data transferred via each port of the plurality of network ports. The method also includes automatically selecting, per packet, whether to consider using one of the at least one secondary network port, over which to send the packet. The selection is based, at least in part, on the historical information and independent of any information about congestion related to any port of the plurality of network ports.

If consideration of using one of the at least one secondary network port has been selected, the method may include identifying a primary network port, based on at least a portion of a destination address within the packet, as well as automatically selecting one port from at least one secondary network port associated with the primary network port, over which to send the packet.

If consideration of using one of the at least one secondary network port has been selected, the method includes selecting a primary port or a secondary port, over which to send the packet. The primary network port is one of the plurality of network ports, based on at least a portion of a destination address within the packet. At least one secondary network port is associated with the primary network port.

If the packet contains a routing limitation flag, the method may include selecting the primary network port, over which to send the packet. In other words, if the routing limitation flag is set, the method may include selecting the primary network port, and not considering any secondary network port.

If at least a portion of a destination address within the packet meets a predetermined criterion, the method may include selecting the primary network port. In other words, if at least a portion of a destination address within the packet meets the predetermined criterion, the method may not consider any secondary network port.

The method may include considering only a subset of the at least one secondary network port associated with the primary network port, such as if at least a portion of a destination address within the packet meets a predetermined criterion. The subset may be based on at least a portion of the destination address within the packet.

During each time unit, the method may involve sending at most a portion of a packet (a "flit"), which is less than the entire packet, via the port.

The historical information may include information indicating whether at least a portion of any packet was sent via the port during a time unit. The historical information may be stored per port of the plurality of network ports. The historical information may be gathered for each time unit of a plurality of preceding time units. The method may further include identifying a primary network port, based on at least a portion of a destination address within the packet. If the historical information for the primary network port does not exceed a predetermined threshold value, the method may include selecting the primary network port, over which to send the packet. Otherwise, a secondary network port associated with the primary network port may be considered for use, over which to send the packet.

If a secondary network port has become congested, the method may not select the congested port.

If consideration of using one of the at least one secondary network port has been selected, the method may include selecting which port of the plurality of network ports over which to send the packet. The selection may be based at least in part on the historical information and/or information about congestion related to a port of the plurality of network ports.

At least a portion of a destination address in the packet may be used to determine whether the historical information and/or the information about congestion is used to select which port of the plurality of network ports over which to send the packet.

If consideration of using one of the at least one secondary network port has been selected, automatically selecting which port of the plurality of network ports over which to send the packet may be performed according to a round-robin selection scheme and/or according to a congestion avoidance scheme.

Accumulating the historical information may include accumulating a trailing sum.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

In illustrative embodiments, an adaptive router anticipates possible future congestion and enables selection of an alternative route before the congestion occurs, thereby avoiding the congestion. The adaptive router may use a primary route until it predicts congestion will occur. The adaptive router measures packet traffic volume, such as flit volume, on a primary network interface to anticipate the congestion. The adaptive router maintains a trailing sum of the number of flits handled by the primary network interface over a trailing time period. If the sum exceeds a threshold value, the adaptive router assumes the route will become congested, and the adaptive router enables considering routing future packets, or at least the current packet, over possible secondary routes.

DEFINITIONS

As used herein, the following terms have the following definitions, unless their context indicates otherwise.

Computer—an electronic system that includes a memory that stores coded instructions and a processor coupled to the memory and configured to fetch and execute the instructions.

Network interface (NI)—a hardware component that connects a computer to a computer network. A network interface is sometimes also referred to as a network interface card or a network adapter. Each network interface can terminate a single network link, although several network interfaces may share common hardware.

Network port—a physical connector at which a network link terminates at an associated network interface. As used herein, a network port includes the associated network interface.

System Architecture

Figure 1:
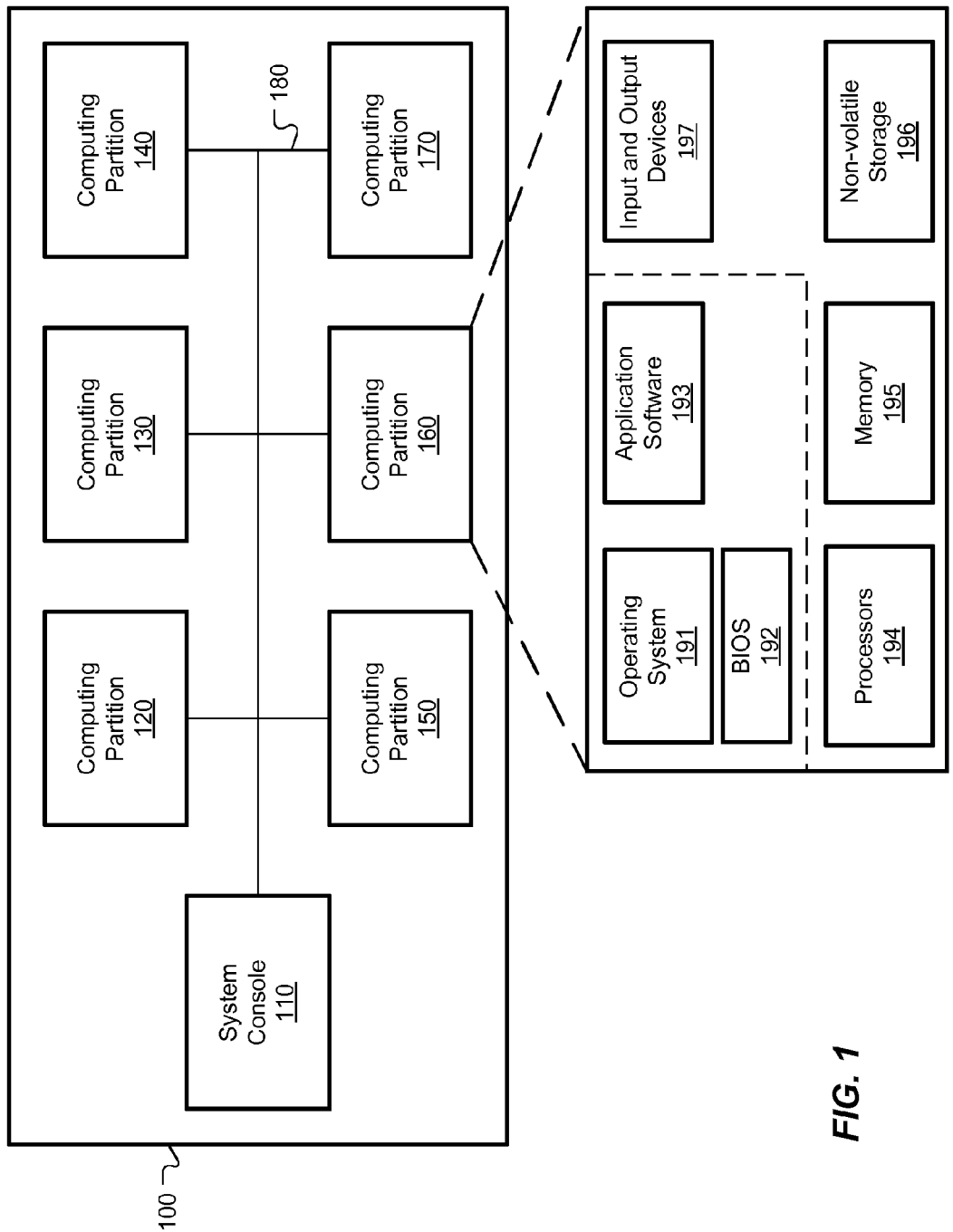
FIG. 1 schematically shows a logical view of an HPC system, in accordance with an embodiment of the present invention.

FIG. 1 schematically shows a logical view of an exemplary high-performance computing system 100 that may be used with illustrative embodiments of the present invention. Specifically, as known by those in the art, a "high-performance computing system," or "HPC system," is a computing system having a plurality of modular computing resources that are tightly coupled using hardware interconnects, so that processors may access remote data directly using a common memory address space.

The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Wash., or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
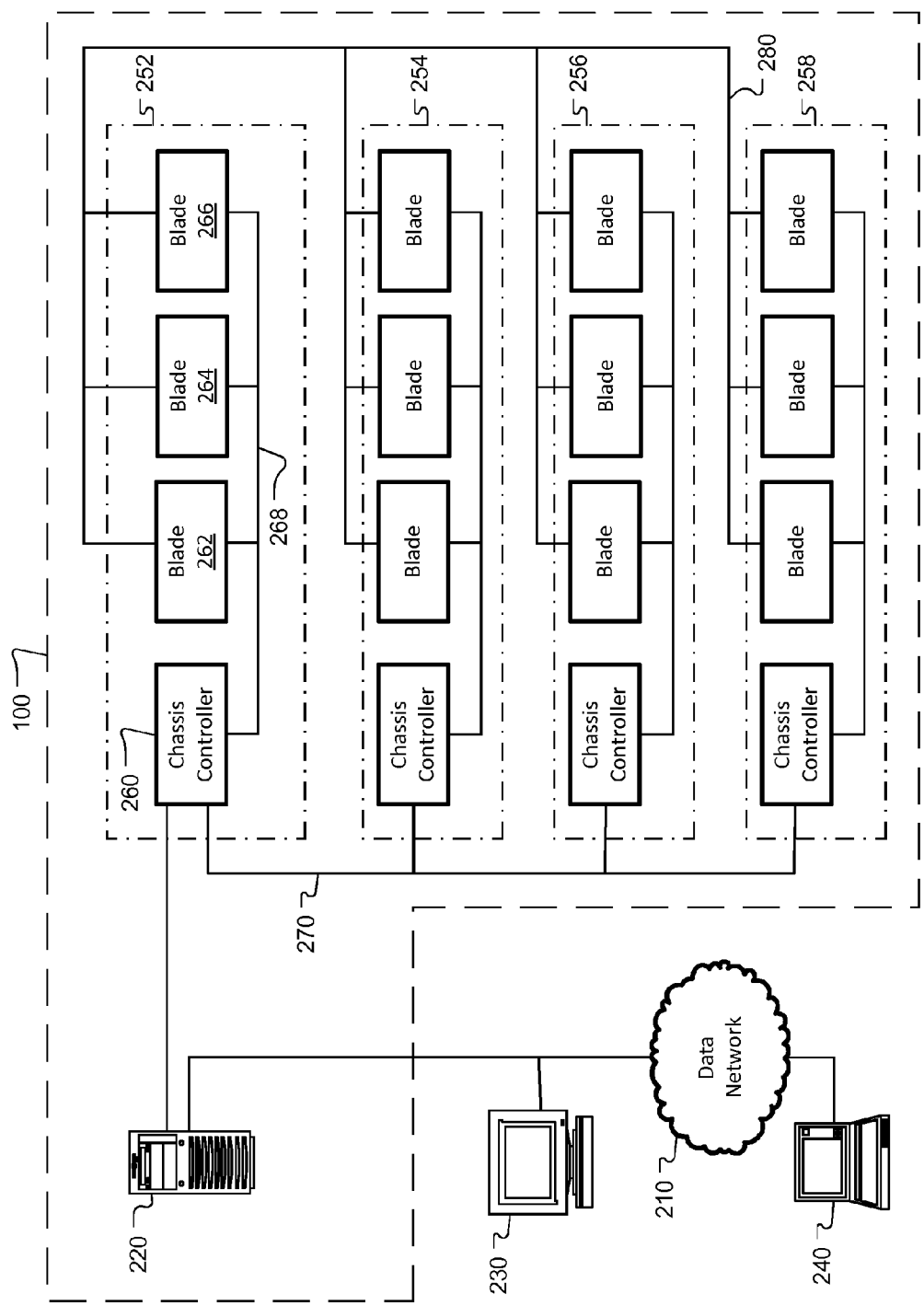
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a user or enterprise data network 210 to facilitate user or enterprise access.

The HPC system 100 includes a system management node ("SMN") 220 that performs the functions of the system console 110. The management node 220 may be implemented as a desktop computer, a server computer, or other similar computing device, provided either by the user or enterprise or the HPC system designer, and includes software necessary to control the HPC system 100 (i.e., the system console software).

The HPC system 100 is accessible using the data network 210, which may be any suitable network, such as a user or enterprise local area network ("LAN"), a virtual private network ("VPN"), the Internet, a combination of these networks or the like. Any of these networks may permit a number of users to access the HPC system resources remotely and/or simultaneously. For example, the management node 220 may be accessed by a user or enterprise computer 230 by way of remote login using tools known in the art such as Windows® Remote Desktop Services or the Unix secure shell. If the user or enterprise is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink®, developed by Silicon Graphics International Corp. of Fremont, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a user or enterprise computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of microprocessors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
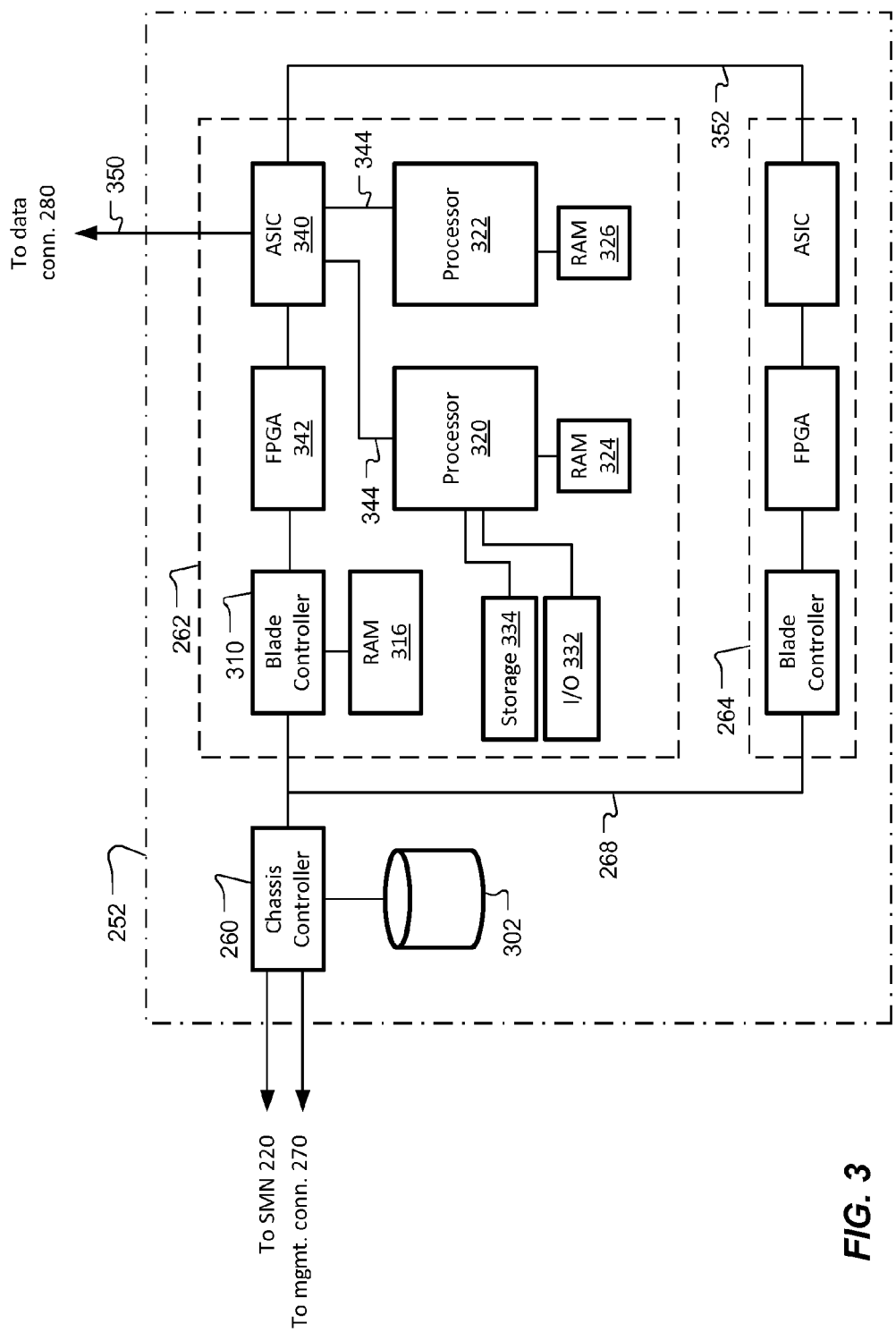
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more processors 320, 322 that are connected to RAM 324, 326. Blade 262 may be alternatively configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 by way of a field-programmable gate array ("FPGA") 342 or similar programmable device for passing signals between integrated circuits. In particular, signals are generated on output pins of the blade controller 310, in response to commands issued by the chassis controller 260. These signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments of the present invention, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a user or enterprise may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, a BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade is modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Adaptive Routing

As noted, upon booting, the BIOS 192 (FIG. 1) presents to the operating system a view of partition hardware 120-170 as if it were all present in a single, very large computer, even if the hardware itself is scattered among multiple blade chassis and multiple blades. In this way, a single operating system instance spreads itself across some, or preferably all, of the blades and blade chassis that are assigned to its partition. Once the operating system is safely executing, its partition may be operated as a single logical computer.

In particular, all memory in the partition is directly accessible by all processors of the partition, according to a common memory address space. Each processor, exemplified by processors 320 and 322 (FIG. 3), has its own local memory, exemplified by memory 324 and 326, on the same node 262 as the processor, and the processor 320 or 322 can directly access its memory 324 or 326. In addition, the system is constructed according to a non-uniform memory access ("NUMA") design, in which hardware interconnects 350 and 352 enable a processor on any node of the partition to directly access memory ("non-local memory") of a processor on another node of the partition, although access to non-local memory is generally slower than access to local memory.

Figure 4:
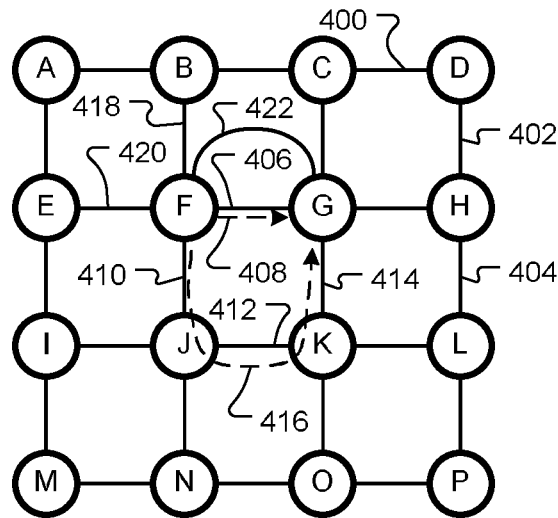
FIG. 4 is a schematic block diagram illustrating an exemplary hypothetical partition implemented as a network of nodes.

Some or all pairs of nodes are interconnected via respective links 350 or 352. FIG. 4 is a schematic block diagram illustrating an exemplary hypothetical partition implemented as a network of nodes A, B, C, . . . P interconnected by links exemplified by links 400, 402, 404, 406, 410, 412, 414, 418, 420 and 422. Each link 400, etc. is a data link connection 280 or a chassis computing connections 352. Each node A-P has a unique numeric node identifier (node ID).

As noted with respect to FIG. 3, each node includes a hub ASIC 340 that controls much of the functionality of the node, including providing logical connections among the processors 320 and 322, memories 324 and 326 and other devices 332-334 of the node. The hub ASIC 340 also manages non-local memory accesses by the processors 320 and 340 to memories on other nodes, as well as non-local memory accesses by processors on other nodes to the memories 324 and 326 on this node. Similarly, the hub ASIC 340 handles direct memory access (DMA) transfers of data by the storage devices 334 and the other I/O devices 332 of this node, when these DMA transfers involve non-local memory on other nodes, as well as non-local DMA transfers by storage and other I/O devices on other nodes when these transfers involve the memories 324 and 326 of this node.

Figure 5:
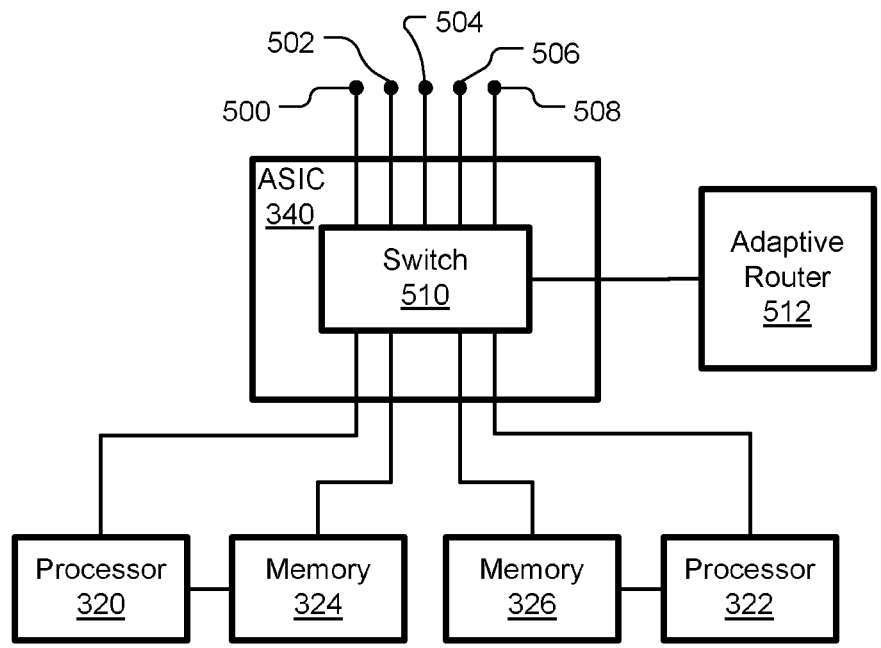
FIG. 5 is a schematic block diagram of a hub ASIC of FIG. 3 and associated components.

FIG. 5 is a schematic block diagram of the hub ASIC 340 and associated components in more detail than is shown in FIG. 3. Each node includes a plurality of network interface (NIs), exemplified by network interfaces 500, 502, 504, 506 and 508. In one embodiment, each node includes 16 network interfaces. A link, such as link 400 (FIG. 4) from another node, may terminate at one of the network interfaces 500-508. The ASIC 340 includes a switch 510, such as a cross-bar switch, that interconnects the network interfaces 500-508 to other components of the node, such as the processors 320 and 322, the memories 324 and 326 and the storage and other I/O devices 334 and 332 (not shown on FIG. 5 for simplicity). Thus, the processors 320 and 322 and the storage and other I/O devices 334 and 332 may communicate, via the switch 510 and the network interfaces 500-508, with memories on other nodes to implement the NUMA design. When a component on one node addresses a non-local memory location, the hub ASIC 340 of that node causes packets containing instructions (such as "read" or "write" and an address and a number of bytes to be transferred) and data to be sent to, and/or received from, the node on which the non-local memory resides.

Returning to FIG. 4, it can be seen that some packet routes between pairs of nodes are shorter than other routes between the same pairs of nodes. For example, nodes F and G are directly connected to each other via link 406. Consequently, non-local memory accesses by, for example, a processor on node F to memory on node G can be relatively fast, if the packets of these accesses follow route 408.

The switch 510 (FIG. 5) in each node may also forward packets arriving at one of its network interfaces 500-508 to another node, via another one of its other network interfaces 500-508. Thus, node F is also indirectly connected to node G via links 410, 412 and 414, yielding route 416. In general, assuming other things are approximately equal among the links 406 and 410-414, route 406 is shorter (i.e., requiring fewer hops) and, therefore, faster than, and preferable to, route 416. However, due to excess traffic on a link, failure of a link or other circumstances, some routes, even longer routes, can be faster than other routes.

Modern processors operate considerably faster than main memories. To reduce instances of "data starvation," most processors include or are coupled to high-speed cache memories, which provide the processors with a small subset of the processors' main memory contents. In multi-processor systems, the cache memories often also provide a small subset of the processors' non-local memory contents. Nevertheless, the speed (in terms of bandwidth and latency) with which non-local memory can be accessed is important, even if only for replenishing caches. Thus, selecting an appropriate route for a non-local memory access is important.

Packets are often broken into smaller units called flow control units (or flow control digits) ("flits"), and the flits of a packet are sent in sequence. Typically, one flit is sent per clock cycle. Flit size may depend on other network parameters or characteristics. Each link 400-404 may provide several virtual channels. For example, one virtual channel may be used for requests, and another virtual channel may be used for replies to the requests. Each virtual channel is implemented by a separate buffer in the network interface. Thus, even if one virtual channel is stalled, due to lack of buffer space for additional flits, other virtual channels on the link may be able to carry flits. One flit typically corresponds to one "credit" used in flow control and often is a fraction of the size of its virtual channel buffer.

Embodiments of the present invention may include four virtual channels per link 400-404, although other numbers of virtual channels may be used. Each packet includes a tag that identifies which virtual channel should handle the packet.

Embodiments of the present invention include an adaptive router 512 (FIG. 5) that selects routes on a packet-by-packet basis. That is, for each packet, a route is selected, and all flits of the packet are sent via the selected route. The adaptive router 512 is described here in the context of non-local memory access to an adjacent node, i.e., to a node that is directly connected by a link to the node initiating the access, as exemplified by nodes F and G. However, this explanation may be used to understand operation of the adaptive router 512 when the nodes are more separated from each other, such as nodes F and P.

Figure 6:
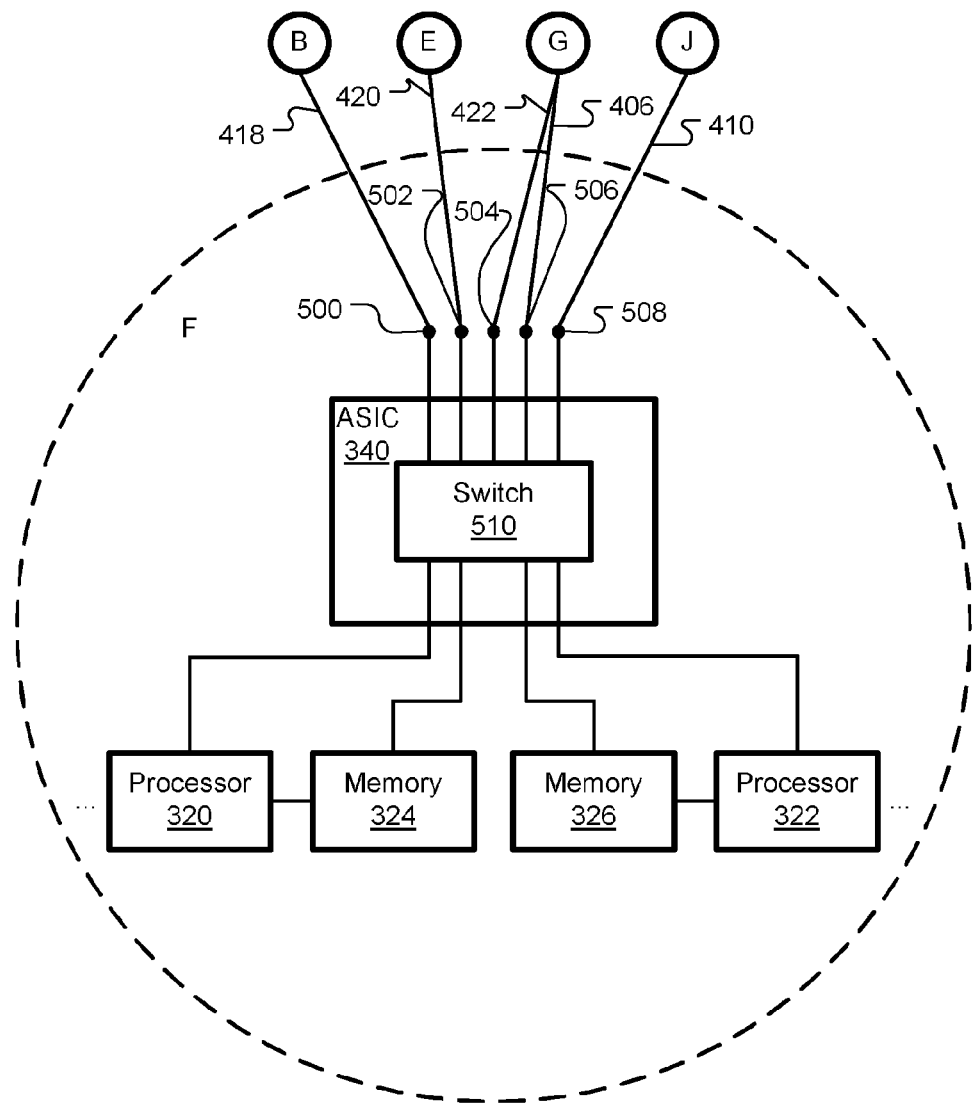
FIG. 6 is a schematic block diagram illustrating an exemplary hypothetical connection of nodes of FIG. 4.

The adaptive router 512 preferentially uses a "primary route," which is typically the shortest route. FIG. 6 is a schematic block diagram, similar to FIG. 5, showing an exemplary hypothetical connection of nodes B, E, G and J to the network interfaces 500-508 of node F. The primary route 408 (FIG. 4) between nodes F and G is via link 406, which terminates on network interface 506. We refer to link 406 as the "primary network link," and we refer to network interface 506 as the "primary network interface," for packets originating in, or flowing through, node F and having a destination address (destination node identifier) of node G.

Other routes between nodes F and G are possible. These other routes are referred to as possible "secondary routes." For example, route 416 (FIG. 4) is a possible secondary route. This route is via link 410, which terminates on node F's network interface 508. Thus, we refer to link 410 as a possible "secondary network link," and we refer to network interface 508 as a possible "secondary network interface." Other possible secondary routes, other possible secondary links and other possible secondary network interfaces also exist. For example, network interface 500 is a possible secondary network interface for a possible secondary route that traverses nodes B and C on the way to node G.

It should be noted that secondary routes need not necessarily involve a hop through an intermediate node. For example, nodes F and G may be directly connected to each other by another link 422.

As noted, the adaptive router 512 selects routes for packets. The adaptive router 512 selects either the primary route or one of the possible secondary routes. Although avoiding congested routes is desirable, we have found that route selection based solely on information about congestion in the primary route or in possible secondary routes can cause undesirable oscillation in the route selection subsystem. Furthermore, waiting until the primary route becomes congested to select an alternative route necessarily causes delays in packet traffic, due to the congestion.

An embodiment of the adaptive router 512 anticipates possible future congestion and enables selection of an alternative route before the congestion occurs, thereby avoiding the congestion. In one embodiment, the adaptive router 512 uses the primary route until it predicts congestion will occur. The adaptive router 512 measures packet traffic volume (more particularly, flit volume) on the primary network interface to anticipate the congestion. The adaptive router 512 maintains a trailing sum of the number of flits handled by the primary network interface over a trailing time period. If the sum exceeds a threshold value, the adaptive router 512 assumes the route will become congested, and the adaptive router 512 enables considering routing future packets, or at least the current packet, over possible secondary routes.

Because the sum is maintained over a trailing period of time, a small burst of flits, in the absence of much other traffic, does not cause the threshold to be reached, and the small burst of flits is "forgotten" (dropped from the trailing sum) before the sum reaches the threshold. However, a large burst of flits does cause the threshold to be reached, consistent with our theory that a large burst of flits is likely to be followed by yet more flits within a relatively short period of time, and if all these flits were transported over a single link, the link is likely to become congested. For example, a large burst of flits may represent the beginning of a large data transfer, such as a block transfer initiated by a processor or a large DMA transfer to or from an I/O device.

As noted, the adaptive router 512 selects a route for each packet. If the adaptive router 512 has enabled considering routing packets over the possible secondary routes, the adaptive router 512 may use one or more selection criteria to select a route for a packet. For example, the adaptive router 512 may use a round-robin scheme, cycling among the primary route and the possible secondary routes or cycling among only the possible secondary routes. Optionally or alternatively, the adaptive router 512 may use congestion information about the primary route and/or about the possible secondary routes to select which route to use for a packet. It should be noted that using congestion information for determining whether to consider using secondary routes (which this embodiment does not do) is different than using congestion information to select which secondary route to use. Optionally or alternatively, the adaptive router 512 may use one or more other selection criteria to select the route.

Figure 7:
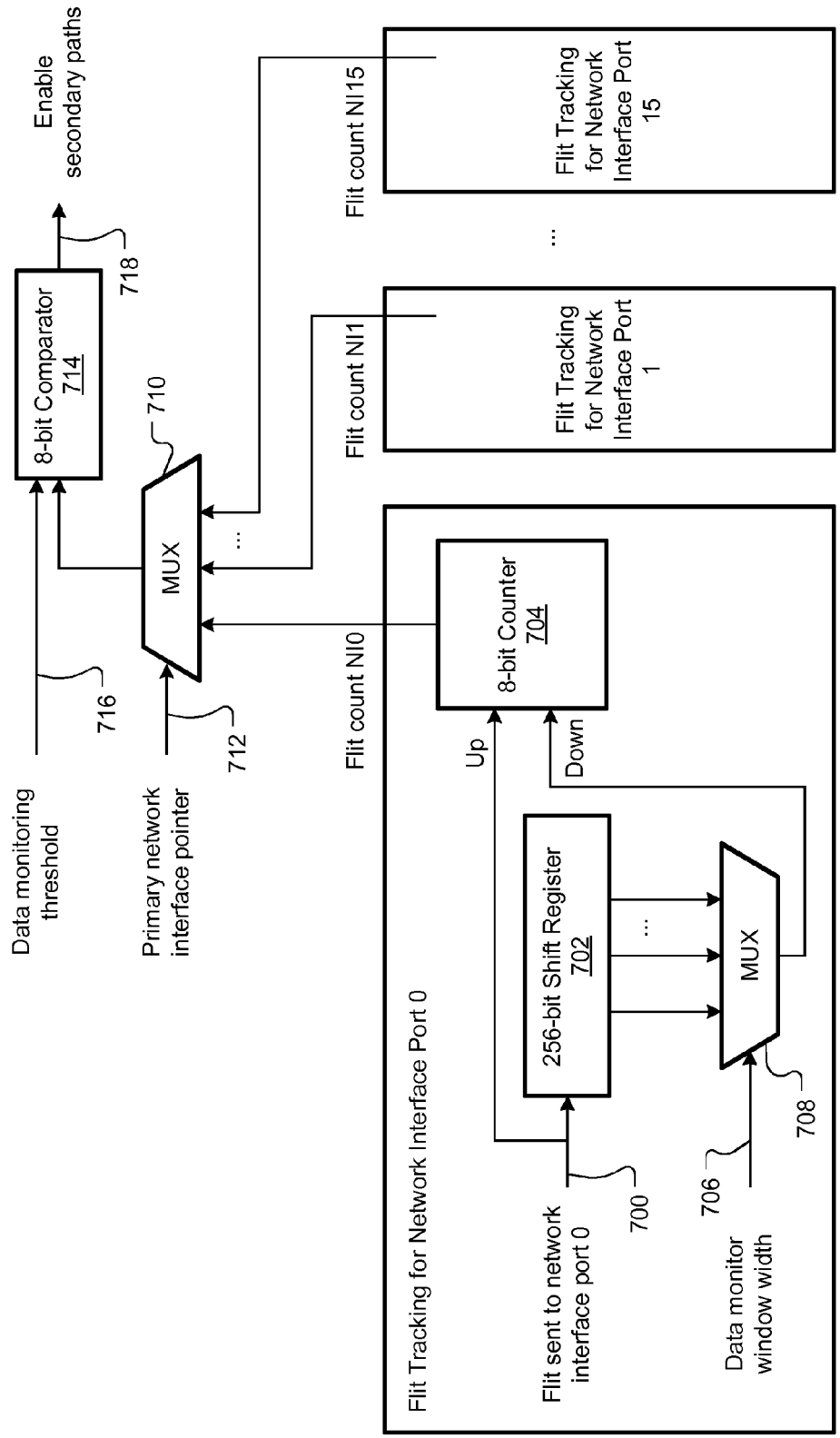
FIG. 7 is a schematic block diagram of a logic circuit used by an adaptive router to maintain a trailing sum of the number of flits handled by a primary network interface over a trailing time period, in accordance with an embodiment of the present invention.

FIG. 7 is a schematic block diagram of a logic circuit used by the adaptive router 512 to maintain the trailing sum of the number of flits handled by the primary network interface over a trailing time period and, if the sum exceeds the threshold, enable consideration of available secondary routes. Recall that during each clock cycle, one flit may be sent via a network interface port 500-508. When a flit is sent via a network interface, the network interface sends a signal to the logic circuit of FIG. 7. For example, if network interface 0 sends a flit, the network interface sends a "1" signal 700, which is received by a shift register 702. The shift register 702 advances one bit per clock cycle. Thus, the number of "1" bits in the shift register 702 represents the trailing sum of the number of flits handled by the primary network interface over the past 256 clock cycles. The signal 700 from the network interface also increments a counter 704.

A data monitor window width signal 706 controls a MUX 708 to pass a selected one of the bits from the shift register 702 to a decrement input on the counter 704. Thus, for example, if the data monitor window width 706 is equal to 96, the 96th bit of the shift register 702 controls the decrementing of the counter 704. Consequently, the counter 704 contains the trailing sum of the number of flits handled by the primary network interface over the past 96 clock cycles. Therefore, the data monitor window width signal 706 controls the length of time represented by the trailing sum in the counter 704. The counter 704 provides the trailing sum as a signal "Flit count NI0" to another MUX 710.

Similarly, each of the other network interfaces 500-508 generates a similar signal when it handles a flit, and similar shift registers, MUXes and counters (not shown) generate similar "Flit count NI1," . . . "Flit count NI15" signals.

The MUX 710 selects one of the "Flit count NIx" signals, based on a primary network interface pointer signal 712, i.e., depending on which network interface port is considered the primary network interface port for the current packet. Output from the MUX 710 is compared by a comparator 714 to a threshold value 716. If the trailing sum is greater than the threshold value 716, the comparator 714 generates a signal 718, which enables the adaptive router 512 (FIG. 5) to consider using secondary routes.

Figure 8:
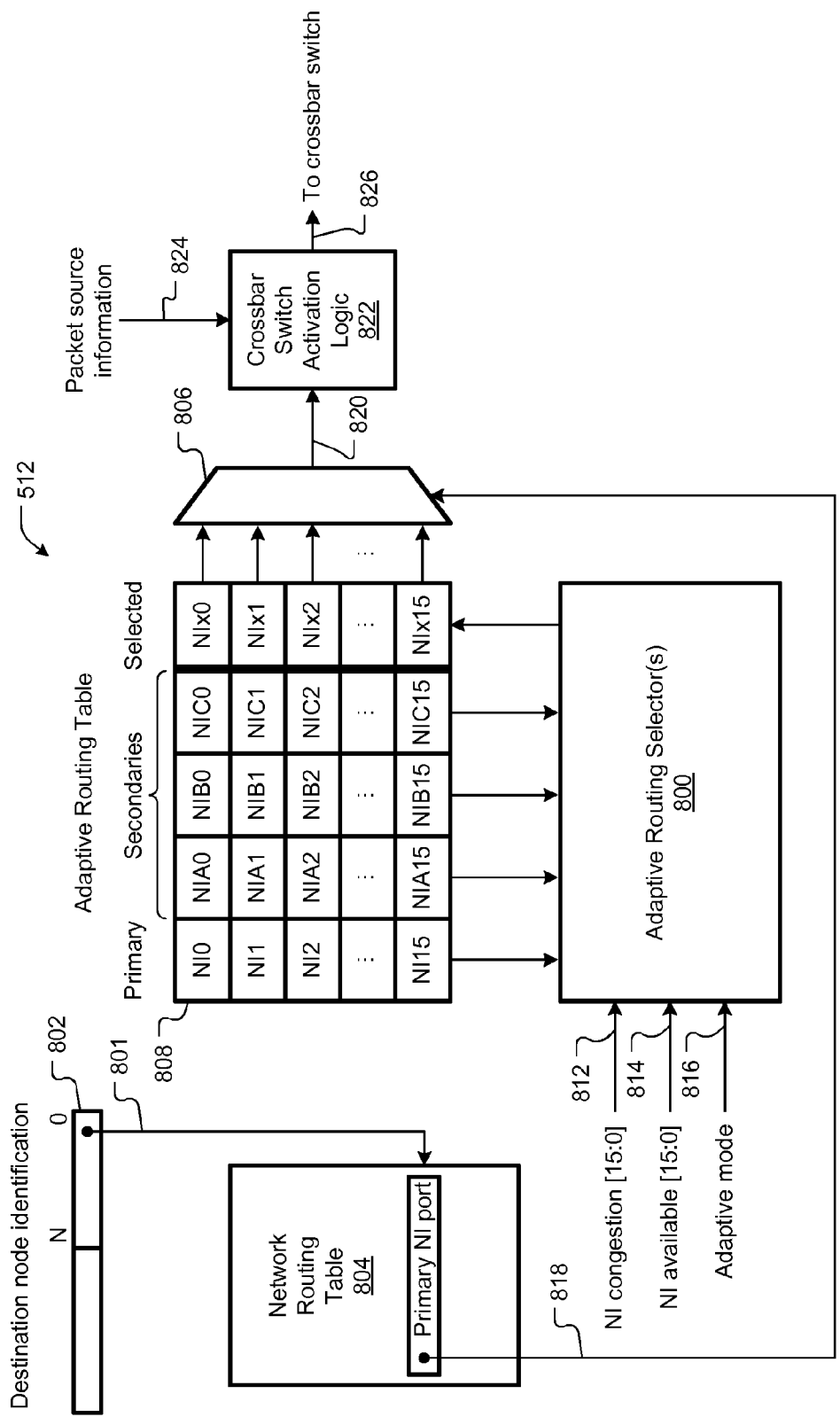
FIG. 8 is a schematic block diagram of an adaptive router, in accordance with an embodiment of the present invention.

FIG. 8 is a schematic block diagram of an embodiment of the adaptive router 512. The logic circuit of FIG. 7 is included in adaptive routing selector(s) 800 of the adaptive router 512. A portion 801 of a destination node identifier 802 in a packet is used to index into a network routing table 804. (The portion 801 is shown extending from bit 0 to bit N of the destination node identification 802. However, the portion 801 need not extend from bit 0.) The network routing table 804 is used to route packets that are destined to nodes that are within a local area, as described in more detail below. The network routing table 804 stores a primary network interface port number in each entry of the table 804. Absent an adaptive router, the indexed table entry's contents could be used to select the network interface 500-508 (FIG. 5), over which to send the packet. However, this primary network interface port number is provided to a multiplexor (MUX) 806, which selects one of 16 entries in an adaptive routing table 808.

The 16 entries in the adaptive routing table 808 correspond to the 16 network interfaces 500-508 (only five network interfaces are shown in FIGS. 5 and 6 for simplicity). Each entry of the adaptive routing table 808 includes a field (in a column labeled "Primary") that stores a physical network interface port number for this network interface. Typically, this field contains a number equal to its row number in the adaptive routing table 808. However, it is possible to map primary network interface ports (represented in the network routing table 804) to different physical network interface ports 500-508 by storing appropriate physical network port numbers in these fields.

In this embodiment, the adaptive router considers the primary network interface and three secondary network interfaces when deciding how to route a packet. In other embodiments, other numbers of secondary network interfaces can be considered. The adaptive routing table 808 includes one column for each possible secondary network interface. Thus, in this embodiment, the adaptive routing table 808 includes three columns labeled "Secondaries." Each field in these three columns can contain a number of a physical network interface port. For example, the first secondary physical network port number for the first primary network interface port is represented by "NIA0" in the adaptive routing table 808.

Not all of the Secondary fields need to be used in any given row of the adaptive routing table 808. For example, if none, one or two secondary routes are desired for a given primary network interface port, that number of Secondary fields may be filled in.

Fields of the adaptive routing table 808 may be implemented as memory-mapped registers to facilitate loading and modifying their contents by software, such as by the operating system 191 (FIG. 1) being executed by the processor 320 or 322. The adaptive routing table 808 should be filled in with data consistent with information about this node, topology of the links 406, 410, 418 and 420 (using node F as an example, FIG. 4) connected to this node, which nodes should be reachable from this node and relative priorities of reaching those nodes.

For example, links should be assigned as secondary routes so as to potentially distribute traffic across many links and avoid overburdening one or a small number of links by assigning the one or small number of links to a disproportionate number of routes. Links should be assigned to primary and secondary routes with awareness that a given link that is assigned as a secondary route may be a primary route for another node pair. On the other hand, if two nodes have more than one link directly interconnecting them, the second and subsequent (if any) such link(s) may make desirable secondary routes between the two nodes.

The network routing table 804 may similarly be implemented as memory-mapped registers.

The adaptive routing selector(s) 800, which may be implemented as combinatorial logic, a field-programmable gate array, part of the hub ASIC 340 or any other suitable circuit, accepts inputs, including network interface congestion information 812, network interface availability information 814 and an adaptive mode selector 816. This information and selector are described in more detail below. Based on this information and the selector, as well as the contents of the primary and secondary columns of the adaptive routing table 808 and the signal from the logic of FIG. 7 indicating whether secondary routes should be considered, the adaptive routing selector(s) 800 supply values for the last column (labeled "Selected") of the adaptive routing table 808. That is, based on these inputs, the adaptive routing selector(s) 800 select either the Primary or one of the Secondary network interface ports (i.e., a value from one of the first four fields of the adaptive routing table 808) for storage in the Selected field of each row of the table 808.

Recall that each row of the adaptive routing table 808 represents a primary network interface port. The primary network interface port number 818 from the network routing table 804 drives the MUX 806 to select one row of the adaptive routing table 808 and, more particularly, to select the "Selected" field from the row of the table 808. The MUX 806 outputs the selected network interface port number 820, which is fed into crossbar switch activation logic 822.

The crossbar switch activation logic 822 also accepts information 824 about the source of the packet. For example, if the packet originated on this node, the source of the packet may be a portion of the hub ASIC 340. On the other hand, if the packet originated on another node and arrived at this node via one of the network interfaces 500-508, the source of the packet would be the arrival network interface 500-508. The crossbar switch activation logic uses the selected network interface port number 820 and the packet source information 824 to generate control signals 826 to set up the crossbar switch 510 (FIG. 5) so it completes a circuit between the source of the packet and the selected network interface 500-508, and the packet, or at least a flit of the packet, can be sent.

Thus, the adaptive router 512 uses an open-loop mechanism to determine whether to consider secondary routes, in that the adaptive router 512 uses the trailing sum of the number of flits handled by the primary network interface over a trailing time period. The trailing sum is not feedback information, in that the adaptive router 512 does not act to change the trailing sum in the way a closed-loop system reacts to a feedback signal by altering its operation in an attempt to alter the feedback signal. This is in contrast to a closed-loop mechanism for selecting an outgoing network interface port, which uses feedback information about the network interface port, such as an amount of congestion being experienced by the port.

As noted, if the adaptive router 512 has enabled considering routing the current packet over the possible secondary routes, the adaptive router 512 may use one or more selection criteria to select a route for the packet. That is, the adaptive routing selector(s) 800 may use one or more selection criteria to select the route for the packet. For example, the adaptive router 512 may use a round-robin scheme, cycling among the primary route and the possible secondary routes or cycling among only the possible secondary routes.

Optionally or alternatively, the adaptive router 512 may use congestion information 812 about the primary route and/or about the possible secondary routes to select which route to use for a packet. Each network interface 500-508 (FIG. 5) generates a one-bit signal indicating whether the network interface considers the port congested. Collectively, these 16 signals constitute the NI congestion [15:0] signal 812. In some embodiments, the adaptive routing selector(s) 800 never select a congested secondary network interface.

The network interface available signal 814 is a 16-bit signal that indicates, for each network interface 500-508 (FIG. 5), whether the network interface is available for handling packet traffic. Each bit of the signal 814 corresponds to one of the network interfaces 500-508. A disconnected link or a network interface experiencing a hardware or software failure is indicated by a "0" in its bit position in the interface available signal 814. The adaptive routing selector(s) 800 never select an unavailable network interface.

Figure 9:
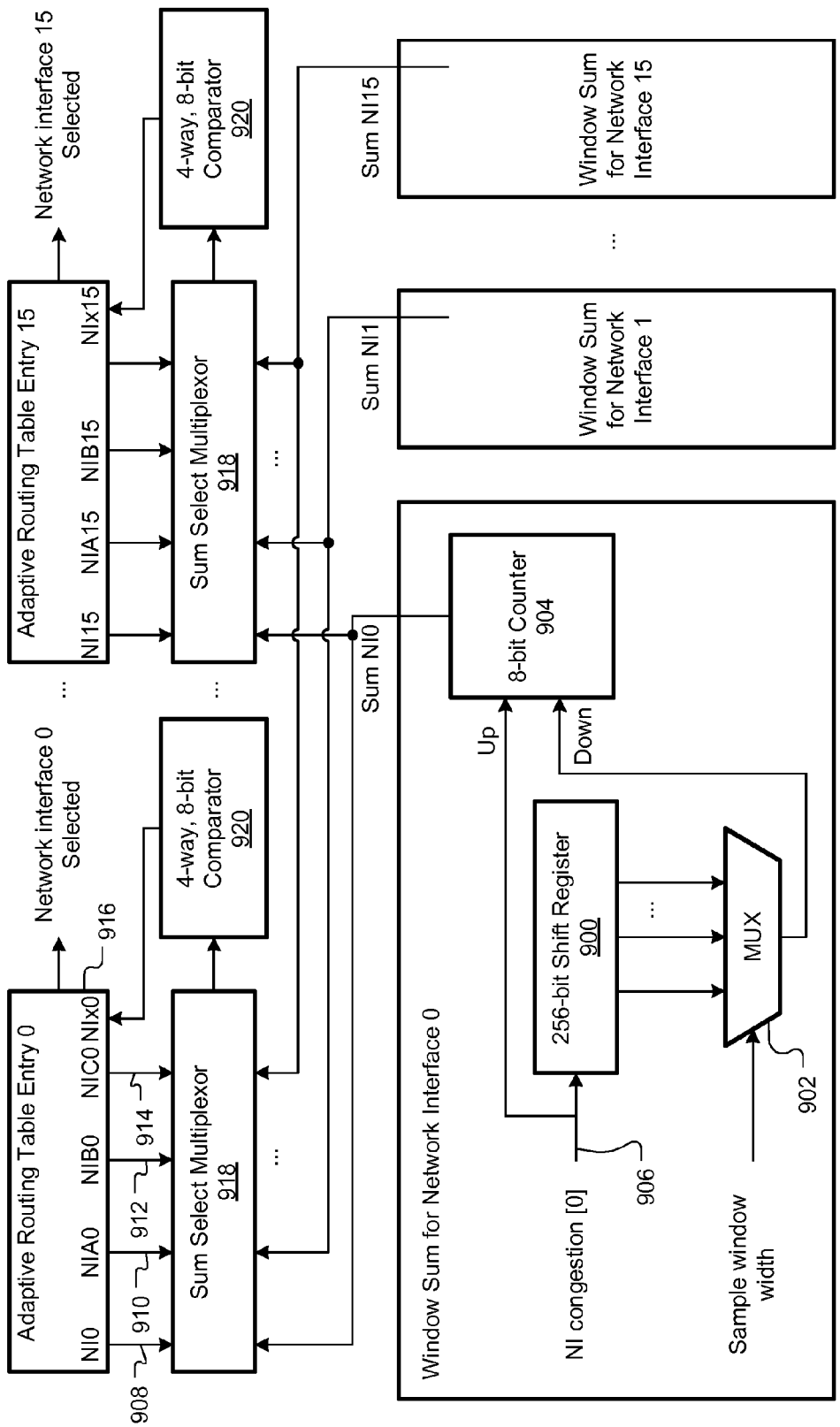
FIG. 9 is a schematic block diagram of a logic circuit used by the adaptive router of FIG. 8 to select a route based on congestion, in accordance with an embodiment of the present invention.

FIG. 9 is a schematic block diagram of a logic circuit used by the adaptive router 512 to select a route, based on congestion. This logic circuit operates in a manner similar to the logic circuit of FIG. 7, in that it uses a shift register 900, a MUX 902 and a counter 904 to maintain a trailing sum ("Sum NI0") of the network port congestion bit 906 for network interface port 0. The network port congestion bit 906 is one of the 16 bits in the NI congestion [15:0] signal 812 (FIG. 8). Similarly, the logic circuit maintains a trailing sum ("Sum NI1" ... "Sum NI15") of the network port congestion for each of the other network interface ports.

The adaptive routing table 808 (FIG. 8) is used to identify the primary network interface port and the three secondary network interface ports for each primary port. For example, signals 908, 910, 912 and 914 (FIG. 9) from the first row 916 of the adaptive routing table indicates the four network interface ports that are candidates for selection for packets destined for the first primary network interface. These signals 908-914 drive a sum select multiplexor 918 to select four of the Sum NIx trailing sum signals and pass them to a 4-way comparator 920. That is, the sum select multiplexor 918 passes the four Sum NIx values corresponding to the four candidate network interface ports (Primary and three Secondaries) stored in the adaptive routing table entry 916. The comparator 920 identifies the lowest value among the four trailing sums and passes the network interface port number corresponding to the lowest trailing sum to the Selected field of the adaptive routing table entry 916.

Similarly, the least congested network interface is selected for each of the other 15 primary network interface ports.

Although not shown, optionally or alternatively, the adaptive routing selector(s) 800 may use a circuit similar to the circuit described with respect to FIG. 9 to select, or as part of a circuit that selects, a network interface based on the trailing sums Flit count NIx generated by the circuit shown in FIG. 7, and optionally additional criteria. Thus, the range of secondary network interfaces from which the adaptive routing selector(s) 800 can choose may vary from clock cycle to clock cycle, or at least from packet to packet.

Optionally or alternatively, some or all of the destination node identifier 802 may be used to determine whether to use congestion information and/or traffic volume information (i.e., the trailing sums Flit count NIx signals) and/or other information for selecting a network interface.

Optionally or alternatively, the adaptive router 512 may use one or more other selection criteria, or a combination of criteria, to select the route. In any case, the "Adaptive mode" signal 816 (FIG. 8) controls which selection criterion or criteria is or are used.

As noted, the network routing table 804 is used to route packets that are destined to nodes that are within a local area. A high-performance computer system, according to the present disclosure, may have nodes interconnected according to a multi-level topology. For example, a three-level topology may be divided into local, regional and global areas. Overlapping or non-overlapping portions of the destination node identifier 802 (FIG. 8) may be used to address sub-networks of the topology, in a manner known in the art.

If a destination of a packet is within a certain distance of a node that originated (or currently has) the packet, the node's network routing table 804 contains all information needed for routing the packet to the destination node and near-by nodes. However, if the destination node of the packet is outside this local area, but within a regional area, the network routing table 804 contains routing information necessary to reach the region where the destination node resides, but not information for reaching the destination node. In this case, a router within the sender's region handles routing the packet to the destination region, and a router within the destination region handles routing the packet within the destination region. Similarly, multiple regions may form a global area, and a router in each global area handles routing packets between global areas.

FIG. 8 shows a two-level mechanism for converting a destination node identification 802 to a network interface port number 820. The first level involves the network routing table 804, and the second level involves the adaptive routing table 808. However, in another embodiment, these two tables can be combined by implementing wider table entries in the network routing table 804, such that the secondary network interface port numbers may be stored in the network routing table 804.

The choice of adaptive mode 816 may be based on any number of criteria. For example, the source of the packet, or its type, may be used to select the adaptive routing selection criteria.

If an entire system, or many of its links, are congested, some embodiments cease considering secondary routes, on the theory that each node should use its most direct route, which should be its primary route.

As noted, routing decisions are made per packet, and whether to consider possible secondary routes is decided per clock cycle. Therefore, some packets may arrive at their destination nodes out of order. For example, a first packet sent from node A to node B may be routed via a secondary route that is longer than a primary route between the nodes, and a later packet may be routed via the primary route. Consequently, although the first packet was sent earlier than the second packet, the second packet may arrive at node B before the first packet. Conventional packet reordering algorithms may be used to restore the packets to their initial temporal order. Consequently, if packet order is important, a packet routing limitation flag may be included in the packet, and the adaptive router may be configured not to consider routing such a packet via any secondary route.

Optionally or alternatively, the adaptive router may be configured not to consider routing a packet, if at least a portion of the packet's destination node identifier (destination address) contains a predetermined value, such as a value that identifies the destination node as being within a predetermined subnetwork. Optionally or alternatively, the adaptive router may be configured to consider only a subset of the secondary routes, if at least a portion of the packet's destination node identifier (destination address) contains a predetermined value, such as a value that identifies the destination node as being within a predetermined subnetwork. The subset of secondary routes may be, for example, only direct routes to the destination node.

In some high-performance systems, internal channels within a node may be faster than links that interconnect nodes. Therefore, even absent congestion of the node-interconnecting links, it may be advantageous to distribute packet traffic from a node across several primary and/or secondary routes.

Figure 10:
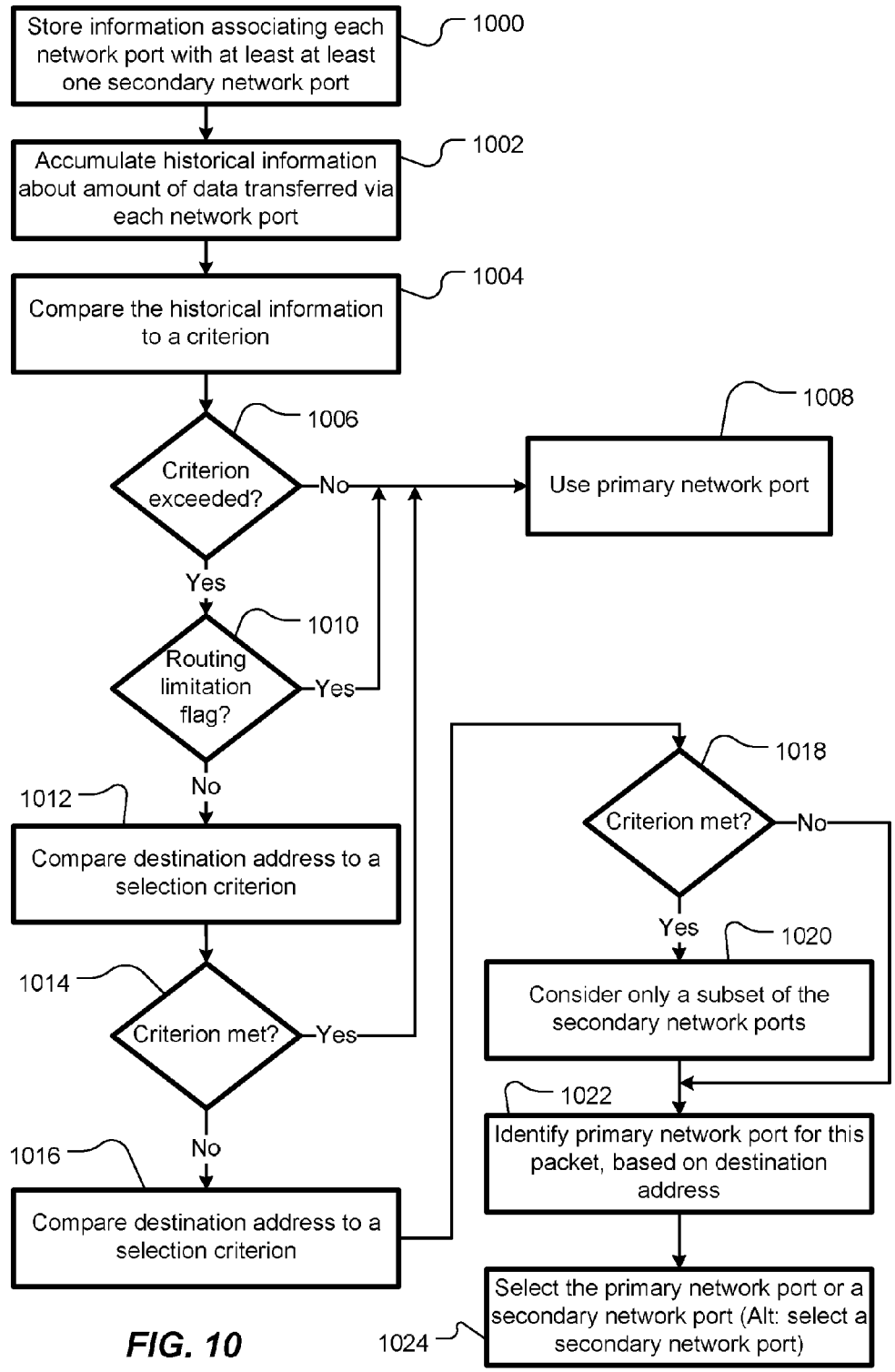
FIG. 10 is a flowchart illustrating a method for adaptively routing packets within a computer system, in accordance with an embodiment of the present invention.

FIG. 10 is a flowchart illustrating a method for adaptively routing packets within a computer system, in accordance with an embodiment of the present invention. At 1000, information associating each primary network port with at least one secondary network port is stored. At 1002, historical information about an amount of data transferred via each network port begins being accumulated. At 1004, for each packet, the historical information is compared to a threshold. At 1006, if the threshold has not been exceeded, control passes to 1008, where the primary network port is used to send the packet. Collectively, 1004 and 1006 select, per packet, whether to consider using a secondary network port.

If the threshold network traffic volume has been exceeded, control passes to 1010, where a check is made whether the packet is flagged to disallow adaptive routing. If so, control passes to 1008, where the primary network port is used to send the packet.

If the packet is not flagged to disallow adaptive routing, control passes to 1012, where some or all of the packet's destination address is checked, according to a criterion to determine if the destination address, or a subnet specified by the destination address, specifies this packet is not a candidate for adaptive routing. If so, at 1014, control passes to 1008, where the primary network port is used to send the packet, otherwise control passes to 1016.

At 1016, some or all of the packet's destination address is checked, according to a criterion to determine if the destination address, or a subnet specified by the destination address, specifies only a subset of the secondary network ports should be considered for routing this packet. At 1018, if so, control passes to 1020, where only a subset of the secondary network ports are considered, otherwise control passes to 1022. At 1022, the primary network port for this packet's destination address is identified, and at 1024, a network port is selected for this packet or flit. The selection may be among the primary network port and the secondary network ports, or among only the secondary network ports, based on other criteria or design of the adaptive router.

While the invention is described through the above-described exemplary embodiments, modifications to, and variations of, the illustrated embodiments may be made without departing from the inventive concepts disclosed herein. Furthermore, disclosed aspects, or portions of these aspects, may be combined in ways not listed above and/or not explicitly claimed. Accordingly, the invention should not be viewed as being limited to the disclosed embodiments.

Although aspects of embodiments, such as the procedure for setting the values of the TSC at startup, may have been described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible, non-transitory, non-writable storage media (e.g., read-only memory devices within a computer, such as ROM, or devices readable by a computer I/O attachment, such as CD-ROM or DVD disks), information alterably stored on tangible, non-transitory, writable storage media (e.g., floppy disks, removable flash memory and hard drives) or information conveyed to a computer through a communication medium, including wired or wireless computer networks.

Although the above discussion discloses various exemplary embodiments of the invention, it should be apparent that those skilled in the art can make various modifications that will achieve some of the advantages of the invention without departing from the true scope of the invention.

What is claimed is:

1. A computer system comprising:
   a first computer comprising:
     a memory;
     a processor coupled to the memory to execute instructions fetched from the memory;
     a plurality of network ports, each network port of the plurality of network ports being connectable, via a respective link, to a respective network port on another computer of the computer system; and
     an adaptive router coupled to the memory, the processor and the plurality of network ports, wherein the adaptive router:
       utilizes packets sent via a port of the plurality of network ports and its respective link to provide non-uniform memory access to the memory by a processor on the another computer and provide non-uniform memory access to memory on the another computer by the processor on the first computer;
       stores, for at least one network port of the plurality of network ports, information associating the network port with at least one other network port of the plurality of network ports as an at least one secondary network port;
       accumulates historical information about an amount of data transferred via each port of the plurality of network ports; and
       automatically determines, per packet, based at least in part on the historical information and independent of any information about congestion related to any port of the plurality of network ports, whether to consider sending the packet via one of the at least one secondary network port.

2. A computer system as recited in claim 1, wherein the stored information associating the at least one secondary network port is programmable.

3. A computer system as recited in claim 1, wherein the adaptive router performs the following, if the adaptive router selects to consider using one of the at least one secondary network port:
   identify a primary network port, based on at least a portion of a destination address within the packet; and
   automatically select one port from at least one secondary network port associated with the primary network port, over which to send the packet.

4. A computer system as recited in claim 1, wherein the adaptive router automatically selects one port from:
   a port (a "primary network port") of the plurality of network ports, based on at least a portion of a destination address within the packet, and
   at least one secondary network port associated with the primary network port,
   over which to send the packet, if the adaptive router selects to consider using one of the at least one secondary network port.

5. Currently amended) A computer system as recited in claim 4, wherein the adaptive router selects the primary network port, if the packet contains a routing limitation flag.

6. A computer system as recited in claim 4, wherein the adaptive router selects the primary network port, if at least a portion of a destination address within the packet meets a predetermined criterion.

7. A computer system as recited in claim 4, wherein the adaptive router considers only a subset of the at least one secondary network port associated with the primary network port, if at least a portion of a destination address within the packet meets a predetermined criterion, wherein the subset is based on at least a portion of the destination address within the packet.

8. A computer system as recited in claim 4, wherein during each time unit, at most a portion of a packet (a "flit"), less than the entire packet, is sent via the port.

9. A computer system as recited in claim 1, wherein:
   the historical information comprises, per port of the plurality of network ports, for each time unit of a plurality of preceding time units, information indicating whether at least a portion of any packet was sent via the port during the time unit; and
   the adaptive router:
     identifies a primary network port, based on at least a portion of a destination address within the packet; and
     if the historical information for the primary network port does not exceed a predetermined threshold value, selects the primary network port, over which to send the packet, otherwise considers using an at least one secondary network port associated with the primary network port, over which to send the packet.

10. A computer system as recited in claim 9, wherein the adaptive router does not select the port, if a port of the at least one secondary network port has become congested.

11. A computer system as recited in claim 1, wherein the adaptive router selects, if the adaptive router selects to consider using one of the at least one secondary network port, which port of the plurality of network ports over which to send the packet, based at least in part on at least one of:
   the historical information; and
   information about congestion related to a port of the plurality of network ports.

12. A computer system as recited in claim 11, wherein the adaptive router uses at least a portion of a destination address in the packet to determine which of the historical information and the information about congestion is used to select which port of the plurality of network ports over which to send the packet.

13. A computer system as recited in claim 1, wherein the adaptive router automatically selects which port of the plurality of network ports over which to send the packet according to a round-robin selection scheme, if the adaptive router selects to consider using one of the at least one secondary network port.

14. A computer system as recited in claim 1, wherein the adaptive router automatically selects which port of the plurality of network ports over which to send the packet according to a congestion avoidance scheme, if the adaptive router selects to consider using one of the at least one secondary network port.

15. A computer system as recited in claim 1, wherein the historical information comprises a trailing sum.

16. A method for routing packets, the method comprising:
by a computer system that includes a first computer having a memory, a processor coupled to the memory to execute instructions fetched from the memory, a plurality of network ports, each network port of the plurality of network ports being connectable, via a respective link, to a respective network port on another computer of the computer system, wherein the first computer utilizes packets sent via a port of the plurality of network ports and its respective link to provide non-uniform memory access to the memory by a processor on the another computer and to provide non-uniform memory access to memory on the another computer by the processor on the first computer, for at least one network port of the plurality of network ports, storing information associating the network port with at least one other network port of the plurality of network ports as an at least one secondary network port;
accumulating historical information about an amount of data transferred via each port of the plurality of network ports; and
automatically selecting, per packet, based at least in part on the historical information and independent of any information about congestion related to any port of the plurality of network ports, whether to consider sending the packet via one of the at least one secondary network port.

17. A method according to claim 16, further comprising, if consideration of using one of the at least one secondary network port has been selected:
identifying a primary network port, based on at least a portion of a destination address within the packet; and
automatically selecting one port from at least one secondary network port associated with the primary network port, over which to send the packet.

18. A method according to claim 16, selecting one port from:
a port (a "primary network port") of the plurality of network ports, based on at least a portion of a destination address within the packet, and
at least one secondary network port associated with the primary network port,
over which to send the packet if consideration of using one of the at least one secondary network port has been selected.

19. A method according to claim 18, further comprising selecting the primary network port, over which to send the packet, if the packet contains a routing limitation flag.

20. A method according to claim 18, further comprising selecting the primary network port, if at least a portion of a destination address within the packet meets a predetermined criterion.

21. A method according to claim 18, further comprising considering only a subset of the at least one secondary network port associated with the primary network port, if at least a portion of a destination address within the packet meets a predetermined criterion, wherein the subset is based on at least a portion of the destination address within the packet.

22. A method according to claim 18, further comprising, during each time unit, sending at most a portion of a packet (a "flit"), less than the entire packet, via the port.

23. A method according to claim 16, wherein the historical information comprises, per port of the plurality of network ports, for each time unit of a plurality of preceding time units, information indicating whether at least a portion of any packet was sent via the port during the time unit; and further comprising:
identifying a primary network port, based on at least a portion of a destination address within the packet; and
if the historical information for the primary network port does not exceed a predetermined threshold value, selecting the primary network port, over which to send the packet, otherwise consider using an at least one secondary network port associated with the primary network port, over which to send the packet.

24. A method according to claim 23, further comprising not selecting the port, if a port of the at least one secondary network port has become congested.

25. A method according to claim 16, wherein selecting, if consideration of using one of the at least one secondary network port has been selected, which port of the plurality of network ports over which to send the packet, based at least in part on at least one of:
the historical information; and
information about congestion related to a port of the plurality of network ports.

26. A method according to claim 25, using at least a portion of a destination address in the packet to determine which of the historical information and the information about congestion is used to select which port of the plurality of network ports over which to send the packet.

27. A method according to claim 16, wherein automatically selecting which port of the plurality of network ports over which to send the packet according to a round-robin selection scheme, if consideration of using one of the at least one secondary network port has been selected.

28. A method according to claim 16, wherein automatically selecting which port of the plurality of network ports over which to send the packet according to a congestion avoidance scheme, if consideration of using one of the at least one secondary network port has been selected.

29. A method according to claim 16, wherein accumulating the historical information comprises accumulating a trailing sum.

* * * * *